United States Patent
La et al.

(10) Patent No.: US 6,885,624 B1
(45) Date of Patent: Apr. 26, 2005

(54) METHODS FOR RECORDING DATA TO OPTICAL MEDIA

(75) Inventors: Luke Kien La, Santa Clara, CA (US); Kenneth James, Pleasanton, CA (US)

(73) Assignee: Sonic Solutions, Inc., Novato, CA (US)

( * ) Notice: Subject to any disclaimer, the term of this patent is extended or adjusted under 35 U.S.C. 154(b) by 344 days.

(21) Appl. No.: 10/224,686

(22) Filed: Aug. 20, 2002

(51) Int. Cl.$^7$ ............................................... G11B 7/00
(52) U.S. Cl. .................. 369/59.1; 369/47.1; 369/47.12; 369/53.1
(58) Field of Search ............................. 369/47.1, 47.11, 369/47.12, 47.13, 53.1, 53.31, 53.44, 59.1, 59.25

(56) References Cited

U.S. PATENT DOCUMENTS 6,016,295 A * 1/2000 Endoh et al. ............ 369/47.16
6,530,009 B1 * 3/2003 James .................... 369/275.3

* cited by examiner

*Primary Examiner*—Muhammad Edun
(74) *Attorney, Agent, or Firm*—Martine Penilla & Gencarella LLP

(57) ABSTRACT

A method for recording data to optical media is provided. Embodiments include receiving a selection of data files to record from a source to a destination optical media, and generating an enumeration of the data files. The enumeration identifies each source file by a source file path node. A location on the destination optical media to record each source file is identified by destination file path node for each data file. Only one occurrence of any source file in the enumeration of data files will be recorded to the destination optical media, and a data tree of files on the destination optical media includes multiple pointers to the same data file.

20 Claims, 4 Drawing Sheets

METHODS FOR RECORDING DATA TO OPTICAL MEDIA

BACKGROUND OF THE INVENTION

1. Field of the Invention

The present invention relates generally to the recording of data onto optical media, and more particularly to a method for optimizing efficient use of optical media, and for optimizing recording efficiency through file linkage.

2. Description of the Related Art

When recording data to optical media, a user typically selects a plurality of files from a source or plurality of sources, identifies a target or destination optical media, and executes a recording function. The selected files can be of any type including audio files, video files, photographic files, data files, and the like. The recording function is typically executed by use of an optical media recording program which accomplishes such tasks as mapping out precise locations of source files, determining size of source files, mapping out a precise target destination for the selected files, calculating a theoretical transfer rate for reading the file from a source and recording the file to a destination, identifying those files that will be cached and those files that will be recorded directly from source to destination, performing necessary formatting as required, and burning the selected files to a destination optical media. Data can be recorded in one or more sessions to a single optical media.

Data recorded to optical media can be arranged, categorized, or structured as desired by use of one or more levels of directories, one or more levels of files or folders, and as many data files as desired within the constraints of the target media capacity. In some optical media recording programs, data structure is established for the target optical media with the design and construction of a data tree or hierarchy which, by way of example, may be a structure of directories or folders into which designated directories, folders, files, and the like are organized.

FIG. 1 shows a typical data tree 10 or structure populated with exemplary data files. Data tree 10 shows a directory called Movies 12 and a directory called Music 14. In the directory Movies 12, three subdirectories are shown entitled Movie1 16, Movie2 18, and Movie3 20. Each of the subdirectories Movie1 16, Movie2 18, and Movie3 20 are shown with files contained therein. In subdirectory Movie1 16, files Movie1.mpg 26, and Movie1-Soundtrack.mp3 28 are shown. Similarly, subdirectory Movie2 18 contains files Movie2.mpg 30 and Movie2-Soundtrack.mpg, and subdirectory Movie3 20 contains the file Movie3.mpg 34.

In directory Music 14, subdirectories Jazz 22 and Misc. 24 are shown. The subdirectory Jazz 22 is shown containing files Song1.mp3 36, Song2.mp3 38, and Song3.mp3 40. The subdirectory Misc. 24 contains Speech1.mp3 42 and Movie2-Soundtrack.mp3 44.

FIG. 1 shows a typical data tree 10 or hierarchical structure of data as might be constructed during the recording of data to an optical media, representing the structure and content of the data recorded to the optical media. As can be seen, the file Movie2-Soundtrack.mp3 is contained in the subdirectory Movie2 18 as well as the subdirectory Misc. 24. Some optical media recording programs will permit the same file to be recorded to different locations within the created structure and having the same file name in both locations, and some optical media recording programs will require the filename be changed. In either method of recording, the duplicate file is typically recorded to the target optical media twice as represented in FIG. 1.

Data tree 10 is a valuable organizing tool for large quantities of data such as can be recorded to optical media. While it may be desired to organize copies of the same file in multiple directories of the same media space, large files can rapidly consume available media space when the same file is recorded a plurality of times to the target or destination optical media. Further, recording multiple copies of a file to an optical media can exhaust or seriously degrade recording resources.

In view of the foregoing, there is a need for a more efficient method of recording data to optical media, and organizing the data recorded. The method should be configured to identify duplicate source files, and to structure destination optical media data and file systems for maximum utilization of available media space.

SUMMARY OF THE INVENTION

Broadly speaking, the present invention fills these needs by providing a method for recording data to optical media that identifies duplicate source files and records a single instance of a user data file to an optical media while providing for a plurality of links to the files from a plurality of locations on the optical media as desired.

The present invention can be implemented in numerous ways, including as a process, an apparatus, a system, a device, a method, or a computer readable media. Several embodiments of the present invention are described below.

In one embodiment, a method for recording data to optical media is disclosed. The method includes receiving a selection of files to record from a source to a destination optical media. An enumeration of the data files is generated identifying each source file of the selection of files by a source file path node. The method further includes identifying a location on the destination optical media to record each source file of the selection of files. The identifying includes using a destination file path node for each data file to be recorded to the destination optical media. The identifying further includes determining whether any source file is in the enumeration of data files more than one time and recording only one occurrence of any source file. The method then includes recording the selection of data files to the destination optical media.

In another embodiment, a computer implemented method for recording a plurality of data files to an optical media is disclosed. The computer implemented method includes generating an enumeration of the plurality of data files. The enumeration includes listing a source location and a file size of each data file of the plurality of data files. The computer implemented method further includes determining whether any one data file of the plurality of data files is included in the enumeration of the plurality of data files more than one time. A file system is then generated for the optical media. The file system includes a location for each data file of the plurality of data files on the optical media. No one data file of the plurality of data files is recorded to the optical media more than one time, and the listing of the source location is by source file path node.

In still a further embodiment, a computer readable media having program instructions for recording data to optical media is disclosed. The computer readable media includes program instructions for receiving a request to record a selection of data files from a source location to a destination optical media, and program instructions for generating an enumeration of the selection of data files to be recorded from the source location to the destination optical media. The enumeration includes a listing of a source file path node and source file size of each data file in the selection of data files. The computer readable media further includes program instructions for performing a system test to determine an average file transfer rate from the source location to the destination optical media, and program instructions for performing a caching algorithm. The caching algorithm is performed for each write speed of a destination optical media recording device. The computer readable media also includes program instructions for constructing a file system for the destination optical media. The file system identifies a destination for each data file in the selection of data files. The computer readable media then includes program instructions for recording the selection of data files to the destination optical media. Only one occurrence of each data file in the selection of data files is recorded to the destination optical media.

The advantages of the present invention are numerous. One notable benefit and advantage of the invention is the more efficient use of available media space over prior art recording methods. In accordance with embodiments of the present invention, only one occurrence of any source file is recorded to a destination optical media. The file system of the destination optical media can include multiple pointers to the same source file, and each reference can identify the source file by a unique or different file name. The referenced source file, however, is recorded to the destination optical media only one time resulting in elimination of unnecessary duplication of data files and more efficient use of available media space.

Another benefit is more efficient use of available recording resources. In accordance with embodiments of the present invention, only one occurrence of any source file is recorded to a session of an optical media space. Multiple references or pointers are provided to the same source file, and the multiple references or pointers can identify the source file by the same file name or by unique or different file names, but each source file is identified by its source file path node and readily apparent as a single source file having multiple references or pointers. In processing files for recording, and in the recording of the source files to the optical media, any source file is only opened and verified one time, and then recorded to the destination optical media only one time resulting in efficient use of available recording resources and elimination of unnecessary duplication of recording processes.

An additional benefit is faster recording of optical media. In accordance with embodiments of the present invention, more efficient use of available media space and more efficient use of available recording resources results in faster recording of optical media over prior art methods.

Other advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements.

DETAILED DESCRIPTION OF THE PREFERRED EMBODIMENTS

Figure 1:
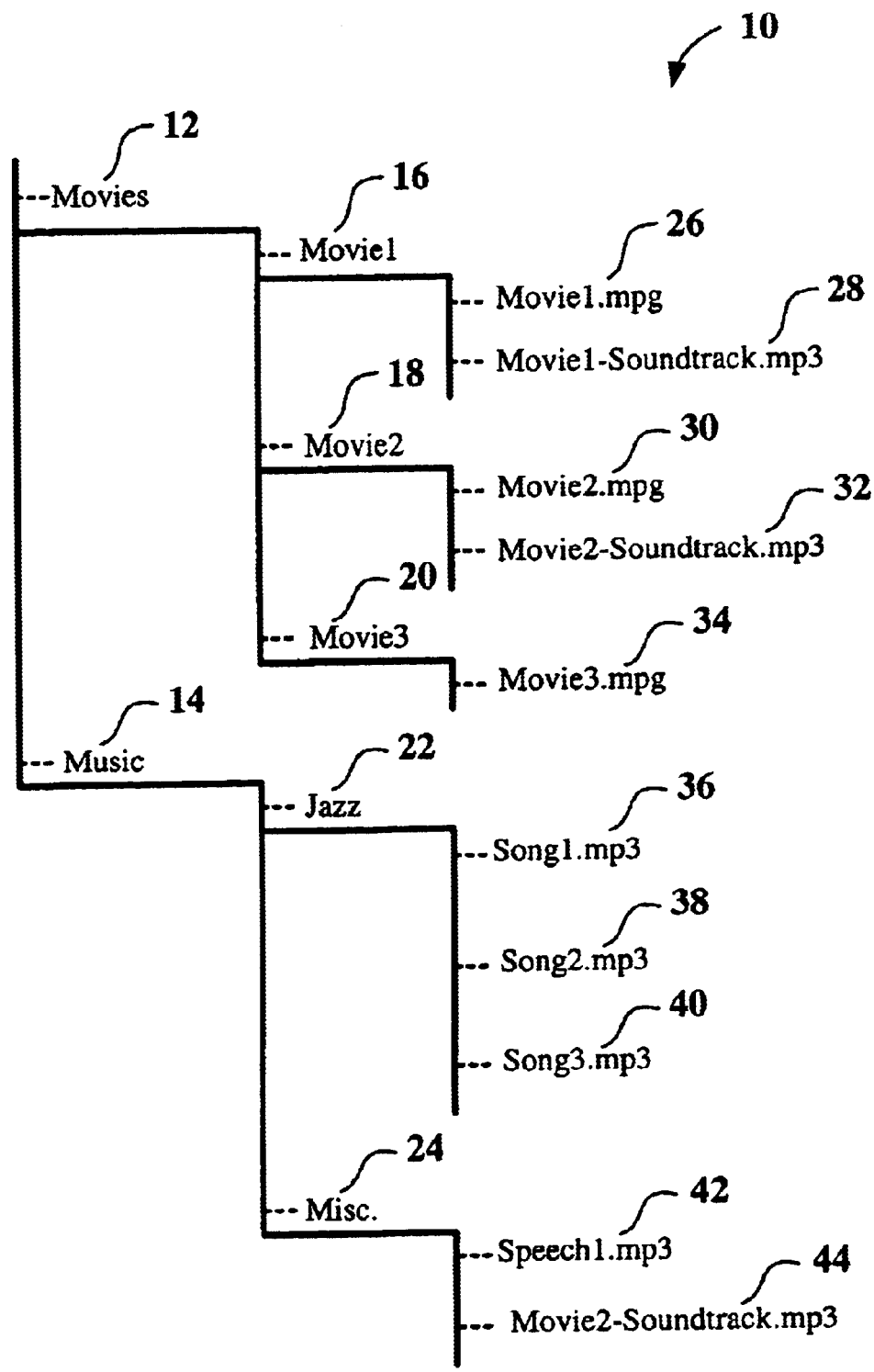
FIG. 1 shows a typical data tree or structure populated with exemplary data files.

An invention for efficiently recording data to optical media is disclosed. In preferred embodiments, methods include providing for recording only a single instance of a source file to an optical media while providing for a plurality of links to the file from multiple structural or organizational locations on the optical media. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Typically, when recording to optical media (e.g., CD-R/RW, DVD-R/RW, DVD+RW, etc.), one or more source files is selected for recording, and a burn or record request is executed. The selection of files can be accomplished in any number of ways including, for example, operator input into the system through the graphical user interface (e.g., dragging one or more files to an optical media device icon on a computer monitor), or executing an optical media read/write software application, and in response to a scripted set of queries, the operator selecting one or more files to be written to a target optical media. In preparation for recording to optical media, a file system database block is generated. The generation of a file system database block includes the performance of a number of file processing operations to map out source locations of each selected file, to sequence the selected files in a recording order, to determine which files will be sent to system cache during the recording operation, to generate pointers and data structures which are passed to the recording engine, and other file processing operations in preparation for the writing or burning of the selected source files to a target optical media. The recording engine then typically reads the selected source files in the writing order into recording circuitry which performs the actual writing or burning of the selected files to the target optical media.

During construction of the file system database block, the source files are examined and processed in order to prepare for the selected files to be recorded on to optical media. Several discrete operations occur in the processing of the source files including examining each of the data files selected for recording to optical media and verifying the source location of the file, the file size, the integrity of the file, and other file attributes to enable the writing of the source data file to a destination optical media. In order to verify the source file, and in order to enable the recording engine to locate and read the file, the file system database block generates a source path for each selected data file. In one embodiment, the source path is a node, also called a file node or file path node, that identifies a source location for each file selected to be recorded, and that will return the source file in response to a single step of calling the file path node. In other words, the source path is not traced through each parent directory and so forth back to a source root each time the source file is accessed or called, but rather the file is identified and subsequently defined by a path node which defines the entire source file path back to a root of a source location. Similarly, a destination location for each selected file on the target optical media is identified and defined by a file path node on the destination optical media. For a detailed description of source path, and file path nodes, and the processing of files in preparation for recording to optical media, reference is drawn to co-pending U.S. patent application Ser. No. 09/962,911, filed on Sep. 24, 2001, assigned to the same assignee as the present application, and the disclosure of which is incorporated herein by reference.

In addition to the identifying and constructing of source file path nodes, processing of files in preparation for recording to optical media includes mapping out destination locations on the target optical media, and constructing file system structures to provide the necessary structure and organization of the files to be recorded to optical media. In one embodiment of the present invention, file system structures include path tables and directory descriptors for the data to be recorded to the optical media. Similar to the source file path nodes identifying source files, file path nodes are constructed for files recorded to the destination optical media and thereby, in one embodiment of the invention, enabling file processing using file path nodes for both source and destination locations of files selected for recording.

Typically, files selected for recording are processed according to the enumeration of files generated by the selection of files to be recorded. Files are typically processed sequentially according to the enumeration of files, and a single file might be enumerated multiple times. Each source file, in turn, is opened and verified, a determination is made whether to read the source file directly into the optical media device buffer during recording or to cache the source file, and other such processing of the selected files. Each file enumerated, however many times it may appear in the enumeration of files, is typically processed in the same manner.

In one embodiment of the present invention, the pre-burn processing of files to be recorded to optical media identifies each source file by file path node, and thereby readily identifies each source file that may be selected more than once for recording to the same target optical media. In one embodiment, as each source file path node is saved to the file system database block, a check is performed to determine if the source file path node already exists in the file system data base block. If the source file path node already exists, the source file path node is saved, but additional file processing is not duplicated. As described above, pre-burn file processing includes opening each source file and verifying file integrity, file size, and the like. In one embodiment of the present invention, the pre-burn processing is completed for a first instance of each file selected for recording to the same target optical media, but is not repeated for any additional instances of the file. The destination file path node constructed and saved in the processing of the first instance of the file is copied and saved as the destination file path node for each subsequent instance.

In one embodiment of the present invention, the path nodes for the destination optical media constructed during the pre-burn processing of files are used for the construction of the path tables, directory descriptors, and other such file and file system structures on the destination optical media. In accordance with one embodiment of the invention, only one instance of a selected file is recorded to the destination optical media. Any duplication of a file is identified by the source file path node. In one embodiment, any file with an identical source file path node as any other file selected for recording is determined to be a duplicate or additional instance of the same file. Embodiments of the present invention identify files in path tables and directory descriptors by use of file path nodes, and therefore any subsequent instance of a file is identified by the same file path node as constructed for the first instance of the file, and the file itself is recorded only once to the destination optical media.

Figure 2A:
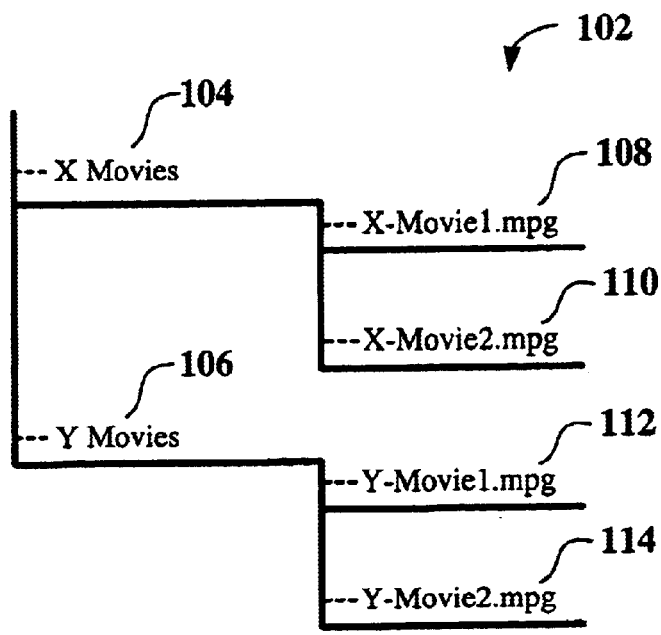
FIG. 2A shows a typical data tree as might be constructed when recording data to optical media in accordance with one embodiment of the present invention.

In one embodiment of the invention, the determination of a first instance of a source file path node is made for each session on multi-session optical media. Further, a source file path node includes file path nodes of imported previous sessions on the multi-session optical media. In one embodiment, if a source file path node is determined to be identifying a file imported from a previous session of a multi-session target optical media, the source file is not processed for duplicate recording to the same target optical media. Entries in path tables and directory descriptors are constructed to point to the location of the file already recorded to the target multi-session optical media FIG. 2A shows a typical data tree 102 as might be constructed when recording data to optical media in accordance with one embodiment of the invention. By way of example, one embodiment of the present invention provides for the construction of a data tree 102, or other similar structural representation of data, for the selection and organization of files to record to a target optical media. In FIG. 2A, the exemplary data tree 102 shows a graphical representation of a "project," "disc," or "media space" into which a user can drag, copy, or otherwise move files to be recorded to optical media, and in which a user can create a directory structure for the selected files, and organize files as desired and as will be presented in a directory or file structure of the target optical media once recorded.

In the exemplary data tree 102 of FIG. 2A, two directories, X Movies 104 and Y Movies 106 are shown, and directory X Movies 104 contains files X-Movie1.mpg 108 and X-Movie2.mpg 110. Directory Y Movies 106 contains files Y-Movie1.mpg 112 and Y-Movie2.mpg 114. The exemplary data tree 150 provides a structure and organization of files desired to be recorded to an optical media in a workspace within which it is easy to construct and manipulate the desired organization of files on the target optical media.

Figure 2B:
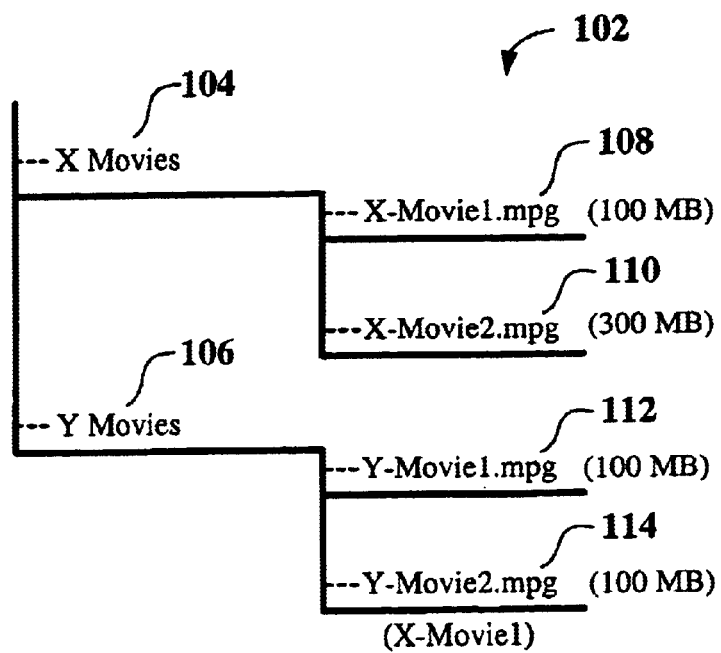
FIG. 2B shows the data tree of FIG. 2A with additional detail about the selected files.

FIG. 2B shows the data tree 102 of FIG. 2A with additional detail about the selected files. In directory X Movies 104, the file size of X-Movie1.mpg 108 is identified as 100 MB, and the file size of X-Movie2.mpg is identified as 300 MB. In directory Y Movies 106, file Y-Movie1.mpg 112 is shown as being 100 MB, and file Y-Movie2.mpg 114 is shown as 100 MB in size. Further, file Y-Movie2.mpg 114 is identified as being the same file as X-Movie1.mpg 108. As described above, when it is desired to organize the same file into more than one location, the file may or may not be required to have a different file name for each instance of the file. In the exemplary data tree 102 shown in FIG. 2B, the file has been assigned different names, but X-Movie1.mpg 108 and Y-Movie2.mpg 114 are names for the same file, as identified by having identical source file path nodes and, as will be described in greater detail below, pointing to the same file path node on the destination optical media. The file size has been identified as having a size of 100 MB.

Assuming typical recording parameters and an optical media having a capacity of approximately 600–700 MB, if each of the files shown in FIG. 2B were recorded to the target optical media, the data in the four files would require approximately 600 MB of media space. If recorded in accordance with prior art recording and formatting processes, the target media may or may not have the capacity to record all of the selected files in addition to the required media space for formatting, file system, and other required structures.

Figure 2C:
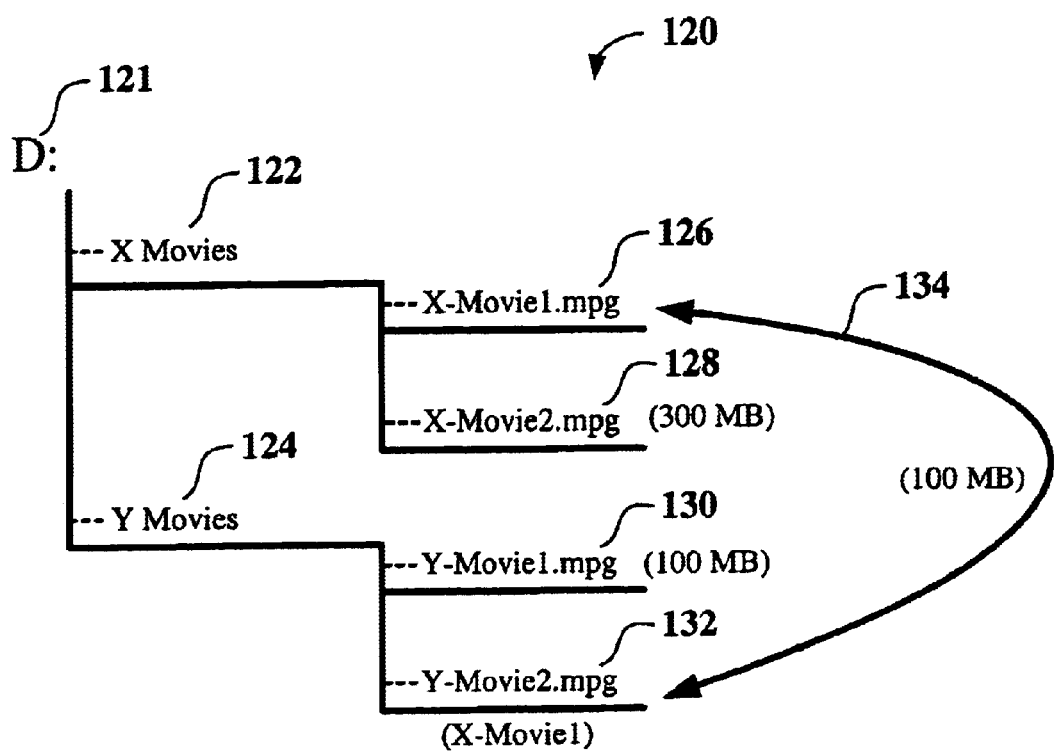
FIG. 2C is a data tree illustrating the structure and organization of data recorded to optical media in accordance with one embodiment of the present invention.

FIG. 2C is a data tree 120 illustrating the structure and organization of data recorded to optical media in accordance with one embodiment of the present invention. FIG. 2C illustrates essentially the same data and organization as illustrated in FIGS. 2A and 2B. The target optical media, D:, 121, is structured to contain two directories of user data, X Movies 122, and Y Movies 124. Each of the two user data directories 122, 124, contains two files. Directory X Movies 122 contains files X-Movie1.mpg 126, and X-Movie2.mpg 128, and directory Y Movies 124 contains Y-Movie1.mpg 130, and Y-Movie2.mpg 132. In one embodiment of the present invention, the data tree 120 lists the files, directories, organization, and structure as constructed by a user during the selection and organization of files to be recorded to optical media, but the data tree 120 is a structure of pointers to the file path nodes for the listed files. In one embodiment of the invention, only one instance of each source file selected for recording to optical media is burned to the target optical media. Any subsequent occurrence copies the file path node of the first instance of the file, and implements that file path node in the path tables, directory descriptors, and any other file system structures identifying user data. Accordingly, a user accessing X-Movie1.mpg 126 from data tree 120 would access a pointer to the file path node of the location of the desired file on the optical media. A user accessing Y-Movie2.mpg 132 would access a pointer to the same file path node. The 100 MB file that corresponds to both X-Movie1.mpg 126 and Y-Movie2.mpg 132 is written to the optical media only once, represented in FIG. 2C as arrow 134 linking the two file entries or pointers.

Similarly, essentially any file can be structured and organized to be accessed from a plurality of locations in a data tree for an optical media, but the data file is recorded to only one location on the media. In the example illustrated in FIG. 2C, the total capacity of the media space required for the selected user data is approximately 500 MB instead of the approximately 600 MB required in the example of FIG. 2B for essentially the same user data. In one embodiment, each listed file name is a pointer to the file path node for the corresponding file. During the selection and organization of files in preparation for recording the optical media, the source file location (the source file path node) identifies a multiple occurrence of the file on the optical media. A file may or may not be re-named when organized to different locations on the target optical media, but a same source identifies the corresponding data file as a multiple occurrence.

Figure 3:
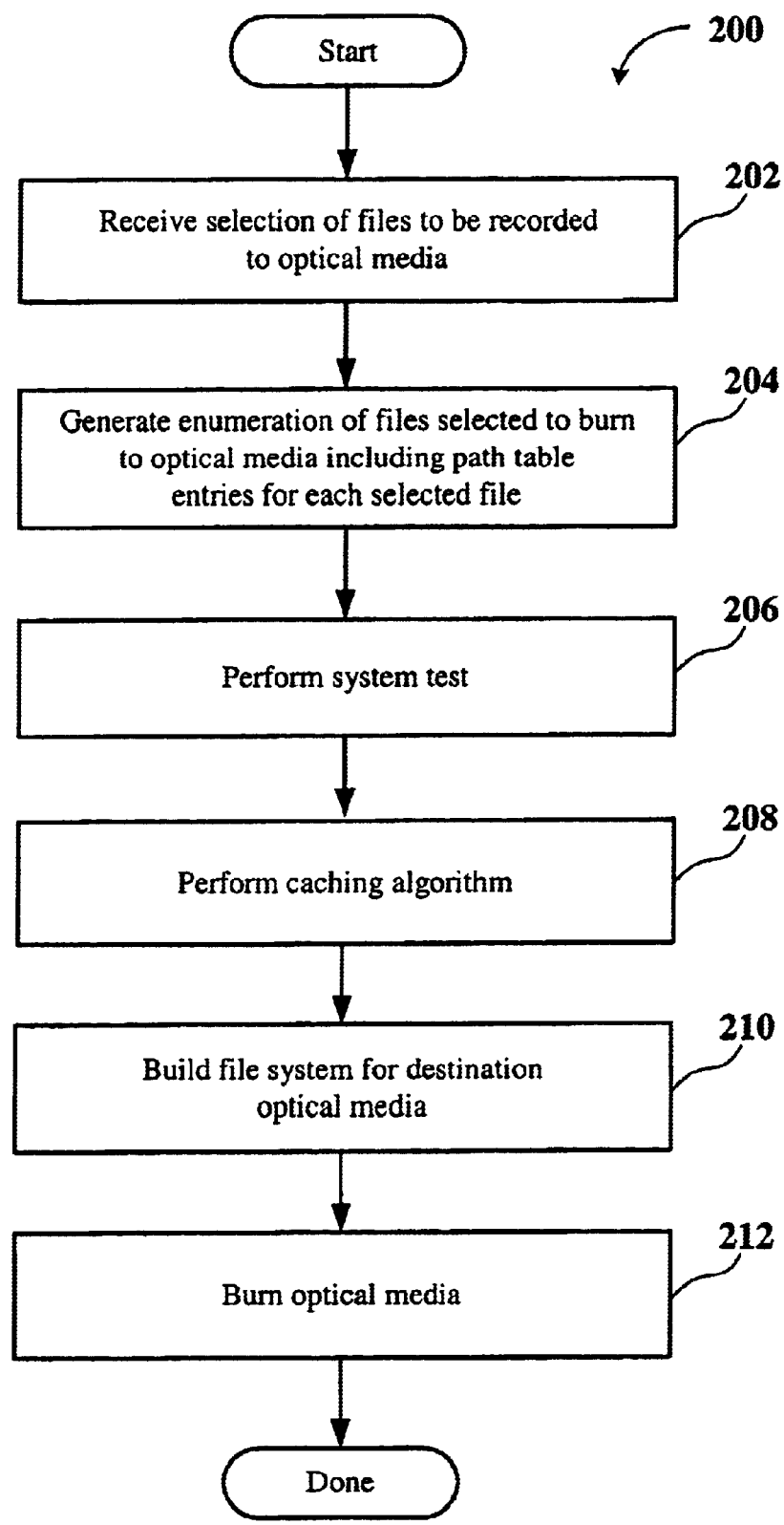
FIG. 3 is a flow chart diagram illustrating the method operations performed in the processing and recording of files to optical media in accordance with one embodiment of the present invention.

It should be further noted that by structuring the data tree 120 to point to the file path nodes for the corresponding data files, removal of a pointer from one or more directories has no impact on pointers that may or may not exist in other directories. If a user no longer desires a file in a particular directory, but desires the file to remain in another directory, the user can delete the pointer in the particular directory, and the file remains accessible from the another directory with no "dangling: references or pointers. Additionally, embodiments of the present invention provide for identification of and pointers to files recorded in a previous session of a multi-session target optical media. Additional references and directory entries can be recorded to a current session identifying a file recorded to a previous session. The referenced file is not processed and is not recorded a second time to the target optical media FIG. 3 is a flow chart diagram 200 illustrating the method operations performed in the processing and recording of files to optical media in accordance with one embodiment of the present invention. The method begins with operation 202 in which a selection of files to be recorded to optical media is received. In one embodiment, the files are selected using any type of optical media recording program or other type of file manipulation providing for selection of one or more files from a source to be recorded to a destination or target optical media.

In operation 204, an enumeration of the selected files is generated. The enumeration, in one embodiment, is a list of the files selected to be burned to optical media, their source locations identified by source file path nodes, the source file sizes, path table entries, and any other necessary or desired file or file system structures for each file selected to be burned to an optical media.

After an enumeration of the selected files has been generated, the method advances to operation 206 in which a system test is performed. The system test is performed to calculate an average file transfer rate. The system test includes evaluating files within a range. The evaluated range is subdivided into small files that are, for example, 0 and 300 KB in size, and large files that may be, for example, larger than 1 Mbyte in size. The source drive is searched for a volume of files of both small and large size and then the system test calculates an average file transfer rate based on the files evaluated. The files evaluated are not necessarily those that have been selected for burning to an optical media. The system test is performed one time, whether or not files are deleted from those selected for transfer, or additional files selected for transfer.

Following the system test, the method advances to operation 208 in which a caching algorithm is performed. The caching algorithm can be a single-pass evaluation of each file in the enumeration of files to be burned to optical media generated in operation 204, or the caching algorithm can include a plurality of evaluations using a plurality of write speeds supported by the target optical media recording device. For a detailed description of caching algorithms, reference is drawn to co-pending U.S. patent application Ser. No. 09/962,911, filed on Sep. 24, 2001, assigned to the same assignee as the present application, and the disclosure of which is incorporated herein by reference.

In one embodiment of the invention, once the caching algorithm is completed in operation 208, and it has been determined which files will be read from their source location and which will be cached, the method advances to operation 210 in which a file system for the files to be recorded to the destination optical media is constructed. In one embodiment, a destination file system includes pointers in a data tree to file locations where data files are recorded to the optical media. Files are identified by file path node with file path nodes written to path tables and directory descriptors. Multiple pointers to the same file can be written into the data tree with directories, subdirectories, and the like organizing the files according to user desires. By way of example, the same file may be listed in a plurality of directories, with each entry corresponding to a pointer that accesses the single occurrence of the file written to the optical media. Additionally, the same file may have a plurality of file names, with each of the plurality of file names linked by calling the same file path node and therefore accessing the same file. In one embodiment, the plurality of pointers or directory entries for a file written only one time to a target optical media includes pointers and directory entries pointing to a file recorded to a previous session of a multi-session target optical media.

Following the building of the file system in operation 210, the method continues with operation 212 in which the optical media is recorded. The process of burning an optical media includes the caching of those files identified to be cached, and then reading the selected files from the source or from system cache into the buffer of the destination optical media recording device, and writing the file systems, user data, and any other required formatting, system, and other structures to the optical media. Once the selected files have been recorded to the optical media, the method is done.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, DVD-ROM, DVD-R/RW, DVD-RAM, DVD+R/+RW, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for recording data to optical media, comprising:

receiving a selection of files to record from a source to a destination optical media;

generating an enumeration of data files to record to the destination optical media, the enumeration of data files identifying each source file of the selection of files by a source file path node;

identifying a location on the destination optical media to record each source file of the selection of files, the identifying including a destination file path node for each data file to be recorded to the destination optical media; and recording the selection of data files to the destination optical media, wherein the identifying each source file of the selection of files by the source file path node includes determining whether any source file is in the enumeration of data files to record to the destination optical media more than one time and recording only one occurrence of any source file in the enumeration of data files to record to the destination optical media more than one time.

2. The method of claim 1, further comprising:

performing a system test to determine an average file transfer rate;

performing a caching algorithm to determine an amount of system cache required to record the selection of data files to the destination optical media; and writing a file system for the destination optical media, wherein the caching algorithm includes evaluating a plurality of write speeds for a destination optical media recording device.

3. The method of claim 2, wherein the enumeration of data files includes opening each source file of the selection of files, verifying the integrity of each source file of the selection of files, and determining a file size of each source file of the selection of files.

4. The method of claim 2, wherein the file system for the destination optical media identifies each file recorded to the destination optical media by the destination file path node.

5. The method of claim 2, wherein the source file path node and the destination file path node includes a complete file path from a root to the data file.

6. The method of claim 5, wherein the data tree includes multiple pointers to a same corresponding data file.

7. The method of claim 2, wherein a data tree of the destination optical media with the selection of data files recorded thereon includes pointers to corresponding data files.

8. The method of claim 2, wherein the source includes a previous session of a multi-session destination optical media.

9. The method of claim 8, wherein when the selection of files includes a previous source file recorded to the previous session of the multi-session destination optical media the previous source file is not recorded again to the multi-session destination optical media.

10. A computer implemented method for recording a plurality of data files to an optical media, comprising:

generating an enumeration of the plurality of data files, the enumeration including listing a source location and a file size of each data file of the plurality of data files;

determining whether any one data file of the plurality of data files is included in the enumeration of the plurality of data files more than one time; and generating a file system for the optical media, the file system including a location for each data file of the plurality of data files on the optical media with no one data file of the plurality of data files to be recorded to the optical media more than one time, wherein the listing of the source location is by source file path node.

11. The computer implemented method of claim 10, wherein the generating of the enumeration of the plurality of data files includes opening each one of the plurality of data files, verifying the integrity of each one of the plurality of data files, and determining a file size of each one of the plurality of data files.

12. The computer implemented method of claim 10, further comprising:

recording one instance of each one of the plurality of data files to the destination optical media; and recording a file system for a session of the optical media identifying each one of the plurality of data files.

13. The computer implemented method of claim 12, wherein a data tree of the optical media organizes the plurality of data files and includes representations for at least each one of the plurality data files.

14. The computer implemented method of claim 13, wherein the data tree of the optical media includes a plurality of representations for a particular one of the plurality of data files, each of the plurality of representations identifying a single same instance of the particular one of the plurality of data files.

15. The computer implemented method of claim 10, wherein the source location includes a previous session of a multi-session destination optical media.

16. A computer readable media having program instructions for recording data to optical media, the computer readable media comprising:

program instructions for receiving a request to record a selection of data files from a source location to a destination optical media;

program instructions for generating an enumeration of the selection of data files to be recorded from the source location to the destination optical media, the enumeration including a listing of a source file path node and source file size of each data file in the selection of data files;

program instructions for performing a system test to determine an average file transfer rate from the source location to the destination optical media;

program instructions for performing a caching algorithm, the caching algorithm being performed for each write speed of a destination optical media recording device;

program instructions for constructing a file system for the destination optical media, the file system identifying a destination for each data file in the selection of data files; and program instructions for recording the selection of data files to the destination optical media, wherein only one occurrence of each data file in the selection of data files is recorded to the destination optical media.

17. The computer readable media of claim 16, further comprising:

program instructions for constructing a data tree representing an organization of the selection of data files, wherein at least one data file in the selection of data files has more than one entry in the data tree.

18. The computer readable media of claim 17, wherein the data tree representing the organization of the selection of data files includes pointers to each data file in the selection of data files.

19. The computer readable media of claim 16, wherein the source location includes a previous session recorded to the destination optical media.

20. The computer readable media of claim 16, wherein the destination optical media is a multi-session destination optical media.

* * * * *